US010114951B2

(12) United States Patent
Cui et al.

(10) Patent No.: US 10,114,951 B2
(45) Date of Patent: Oct. 30, 2018

(54) VIRUS SIGNATURE MATCHING METHOD AND APPARATUS

(71) Applicant: TENCENT TECHNOLOGY (SHENZHEN) COMPANY LIMITED, Shenzhen (CN)

(72) Inventors: Jingbing Cui, Shenzhen (CN); Tao Yu, Shenzhen (CN); Zipan Bai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 228 days.

(21) Appl. No.: 15/101,981

(22) PCT Filed: Feb. 13, 2015

(86) PCT No.: PCT/CN2015/072973
§ 371 (c)(1),
(2) Date: Jun. 6, 2016

(87) PCT Pub. No.: WO2015/124086
PCT Pub. Date: Aug. 27, 2015

(65) Prior Publication Data
US 2016/0306972 A1    Oct. 20, 2016

(30) Foreign Application Priority Data

Feb. 18, 2014   (CN) .......................... 2014 1 0055553

(51) Int. Cl.
*G06F 21/06* (2006.01)
*G06F 21/56* (2013.01)

(52) U.S. Cl.
CPC .......... *G06F 21/564* (2013.01); *G06F 21/562* (2013.01); *G06F 2221/034* (2013.01)

(58) Field of Classification Search
CPC .................................................... G06F 21/564
See application file for complete search history.

(56) References Cited

U.S. PATENT DOCUMENTS

2009/0100055 A1* 4/2009 Wang .................... G06F 21/564
2014/0033311 A1   1/2014 Li et al.

FOREIGN PATENT DOCUMENTS

| CN | 101001242 A | 7/2007 |
| CN | 101017523 A | 8/2007 |

(Continued)

OTHER PUBLICATIONS

The World Intellectual Property Organization (WIPO) International Search Report for PCT/CN2015/072973 dated May 12, 2015.

(Continued)

*Primary Examiner* — Simon P Kanaan
(74) *Attorney, Agent, or Firm* — Anova Law Group, PLLC

(57) ABSTRACT

The present disclosure provides a virus signature matching method, including: obtaining an inputted target file; loading a virus signature database, and successively extracting signature function identifiers from the virus signature database, the virus signature database comprising the signature function identifiers and virus signature type identifiers corresponding to the signature function identifiers; obtaining signature functions corresponding to the signature function identifiers, and checking the target file by invoking the signature functions, to obtain corresponding check results; and obtaining a virus signature type identifier corresponding to the target file according to the check results. In addition, a virus signature matching apparatus is further provided. The foregoing virus signature matching method and apparatus can improve virus scanning and removing efficiency.

22 Claims, 4 Drawing Sheets

(56) References Cited

FOREIGN PATENT DOCUMENTS

| | | | |
|---|---|---|---|
| CN | 101308533 | A | 11/2008 |
| CN | 101710375 | A | 5/2010 |
| CN | 102708320 | A | 10/2012 |
| CN | 102867144 | A | 1/2013 |
| EP | 0896285 | A1 * | 2/1999 ........... G06F 21/564 |

OTHER PUBLICATIONS

The State Intellectual Property Office of the People's Republic of China (SIPO) Office Action 1 for 201410055553.7 dated May 3, 2018 8 Pages (including translation).

* cited by examiner

VIRUS SIGNATURE MATCHING METHOD AND APPARATUS

CROSS REFERENCE TO RELATED APPLICATIONS

This application is a national stage application of PCT application PCT/CN2015/072973, filed on Feb. 13, 2015, which claims the priority benefit of Chinese Patent Application No. 201410055553.7, entitled "VIRUS SIGNATURE MATCHING METHOD AND APPARATUS", filed on Feb. 18, 2014, the content of both of which is incorporated by reference herein in its entirety for all purposes.

FIELD OF THE TECHNOLOGY

The present disclosure relates to the field of computer technologies and, in particular, to a virus signature matching method and apparatus.

BACKGROUND OF THE DISCLOSURE

In a process of scanning and removing computer viruses, existing software for scanning and removing computer viruses or computer Trojan horses checks a to-be-scanned file by matching the target file with signatures in a virus signature database. Generally, each computer virus corresponds to one virus signature record in the virus signature database, and one virus signature record corresponds to a group of signature methods (one or more functions). In a matching process, the to-be-scanned file is checked by invoking signature methods corresponding to a virus signature record. If a returned result of each signature method in this group of signature methods is that the file passes the check, the to-be-scanned file is a virus file or a virus-infected file, and the virus that infects the file is a computer virus or a Trojan horse corresponding to the virus signature record.

However, various virus signature records are generally stored in the virus signature database, which, for example, may separately correspond to panda joss-stick, Graybird, and the like. A computer needs to repeatedly execute multiple signature methods that are in multiple virus signature records, leading to low virus scanning and removing efficiency.

SUMMARY

Therefore, it is necessary to provide a virus signature matching method that can improve virus scanning and removing efficiency.

A virus signature matching method includes obtaining an inputted target file; loading a virus signature database, and successively extracting signature function identifiers from the virus signature database, the virus signature database including the signature function identifiers and virus signature type identifiers corresponding to the signature function identifiers; obtaining signature functions corresponding to the signature function identifiers, and checking the target file by invoking the signature functions, to obtain corresponding check results; and obtaining a virus signature type identifier corresponding to the target file according to the check results.

In addition, it is further provided a virus signature matching apparatus that can improve virus scanning and removing efficiency.

A virus signature matching apparatus includes: a target file obtaining module, configured to obtain an inputted target file; a signature function selection module, configured to load a virus signature database, and successively extract signature function identifiers from the virus signature database, the virus signature database including the signature function identifiers and virus signature type identifiers corresponding to the signature function identifiers; a virus signature matching module, configured to obtain signature functions corresponding to the signature function identifiers, and check the target file by invoking the signature functions, to obtain corresponding check results; and a matching result generating module, configured to obtain a virus signature type identifier corresponding to the target file according to the check results.

When the foregoing virus signature matching method and apparatus perform virus scanning and removing on a target file, a same signature function is executed only once, but is not executed multiple times according to different virus signature types that need to be matched, thereby reducing the number of times the signature function is executed repeatedly, and improving virus scanning and removing efficiency.

DESCRIPTION OF EMBODIMENTS

To make the objectives, technical solutions, and advantages of the present disclosure clearer, the following further describes the present disclosure in detail with reference to the accompanying drawings and embodiments. It should be understood that, the specific embodiments described herein are only used to explain the present disclosure, but are not used to limit the present disclosure.

It may be understood that, terms such as "first" and "second" that are used in the present disclosure may be used herein to describe various elements, but these elements are not limited by these terms. These terms are only used to differentiate a first element from another element. For example, without departing from the scope of the present disclosure, a first client may be referred to as a second client, and similarly, the second client may be referred to as the first client. The first client and the second client are both clients, but are not a same client.

Unless the context clearly indicates otherwise, singular elements or components in the present disclosure may be in the plural and vice versa, which is not limited in the present disclosure. Although steps in the present disclosure are labeled with numbers, such numbers are not intended to limit the order of these steps. Unless the order of steps is explicitly stated or it is explicitly stated that a step needs to be performed on the basis of another step, the relative order of steps can be adjusted. It should be understood that, as used herein, the term "and/or" involves and includes any and all combinations of one or more of the associated listed items.

Figure 1:
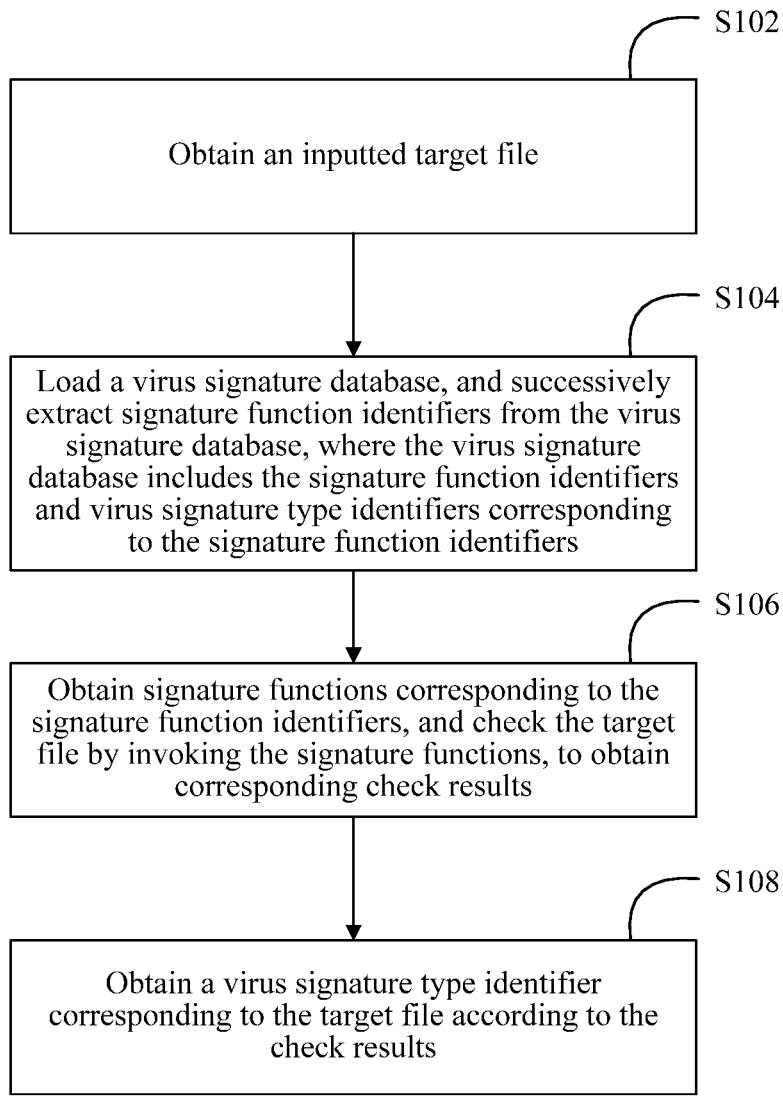
FIG. 1 is a flowchart of a virus signature matching method in an embodiment.

In an embodiment, as shown in FIG. 1, a virus signature matching method is provided, where the method may rely on a computer program, and can run in a computer system that is based on a von Neumann system.

Step S102: Obtaining an inputted target file.

The target file is a file that needs virus scanning. If a user wants to perform virus scanning on a file, the user may select the file, and input or select an instruction of starting virus scanning, and then may input the selected file that needs virus scanning as a target file. In another application scenario, the user may also select a disk partition or directory, and start a global virus scanning and removing instruction, and then may traverse all files in this disk partition or directory, and input each traversed file as a target file.

Step S104: Loading a virus signature database, and successively extracting signature function identifiers from the virus signature database, where the virus signature database includes the signature function identifiers and virus signature type identifiers corresponding to the signature function identifiers.

Identification information of signature functions (that is, the signature function identifiers) that are used for checking the target file is stored in the virus signature database, where the signature function identifier is identification information of a function used to check whether the target file matches a given virus signature, and may include information such as a signature function name, a parameter name, or a parameter value.

For example, if a signature function, namely, checkByKeyWord (String keyword, int offside, File target)

is used to determine whether data that starts from a location having an offset of 100 (that is, an offside value among the parameters is 100) in the target file is a character string "trojan" (that is, a keyword value among the parameters is "trojan"), that is, the function needs to be invoked in the form of:

checkByKeyWord ("trojan", 100, target), where target is an invocation or a pointer of the target file, a signature function identifier of the function may be:

checkByKeyWord#keyword:trojan#offside:100

It should be noted that, the foregoing signature function identifier is only an implementation manner of this method. In another embodiment, a signature function identifier that facilitates program execution may be voluntarily defined as required, which is not limited to the foregoing method for defining the signature function identifier. For example, the signature function identifier may also correspond to a group of functions, where the group of functions may be regarded as a whole, and are all used to check whether the target file corresponds to a virus signature corresponding to the signature function identifier. In another embodiment, multiple signature function identifiers may correspond to a same function, for example, checkByKeyWord#keyword:trojan#offside:100 and checkByKeyWord#keyword:panda#offside:200 may correspond to a same signature function: checkByKeyWord (String[ ] keyword, int[ ] offside, File target), and when the function is invoked, among the function parameters, the array element keyword[0] may be "trojan", and keyword[1] may be "panda"; and among the function parameters, the array element offside [0] may be 100, and offside [1] may be 200.

In this embodiment, the signature function identifiers in the virus signature database may be traversed, and one or more signature function identifiers may be extracted each time. For example, if matching is performed in a single-thread or single-process manner, when the virus signature database is traversed, one signature function identifier may be extracted each time; and if matching is performed in a multi-thread or multi-process manner, when the virus signature database is traversed, signature function identifiers, the number of which corresponds to the number of threads or the number of processes, may be extracted each time.

In this embodiment, the virus signature database needs to be pre-configured, and a method for pre-configuring the virus signature database is: obtaining inputted signature function identifiers, and obtaining inputted virus signature type identifiers corresponding to the signature function identifiers; and generating mapping information between the signature function identifiers and the virus signature type identifiers, and generating the virus signature database according to the mapping information, where the mapping information includes at least one of a one-to-one correspondence, a many-to-one correspondence, a one-to-many correspondence, and a many-to-many correspondence.

The virus signature type identifier corresponds to a specific type of computer virus or Trojan horse. For example, it may be set that a virus signature type identifier of panda joss-stick is 00001, a virus signature type identifier of Graybird is 00002, and a virus signature type identifier of a worm is 00003. The mapping information between the virus signature type identifier and the inputted signature function identifier may be generated. If it is finally obtained through matching that the target file corresponds to one or more virus signature type identifiers, it indicates that the target file has been infected with a computer virus or Trojan horse corresponding to the one or more virus signature type identifiers.

The mapping information may be one-to-one. For example, if the following one and only signature function is used for scanning and removing the panda joss-stick: checkByKeyWord#keyword:panda#offside:100, a record of mapping between checkByKeyWord#keyword:panda #offside:100 and 00001 may be created in the database.

The mapping information may also be many-to-one. For example, if the following two signature functions need to be used for scanning and removing the panda joss-stick: checkByKeyWord#keyword:panda #offside:100, and checkByKeyWord#keyword:panda #offside:200, the following records may be created in the database: a record of mapping between checkByKeyWord#keyword:panda #offside:100 and 00001, and a record of mapping between checkByKeyWord#keyword;panda #offside:200 and 00001 (that is, multiple signature function identifiers correspond to one virus signature type identifier).

The mapping information may also be one-to-many. For example, if the following signature function needs to be used for scanning and removing the panda joss-stick and the Graybird: checkByKeyWord#keyword:trojan #offside:100, the following records may be created in the database: a record of mapping between checkByKeyWord#keyword: trojan #offside:100 and 00001, and a record of mapping between checkByKeyWord#keyword:trojan #offside:100 and 00002 (that is, one signature function identifier corresponds to multiple virus signature type identifiers).

The mapping information may also be many-to-many. For example, if the following signature functions need to be used for scanning and removing the panda joss-stick and the Graybird: checkByKeyWord#keyword:trojan #offside:100, and checkByKeyWord#keyword:trojan #offside:200, the following records may be created in the database: a record of mapping between checkByKeyWord#keyword:trojan #offside:100 and 00001, a record of mapping between checkByKeyWord#keyword:trojan #offside:100 and 00002, a record of mapping between checkByKeyWord#keyword: trojan #offside:200 and 00001, and a record of mapping between checkByKeyWord#keyword:trojan #offside:200 and 00002, (that is, multiple signature function identifiers correspond to multiple virus signature type identifiers).

Step S106: Obtaining signature functions corresponding to the signature function identifiers, and checking the target file by invoking the signature functions, to obtain corresponding check results.

Step S108: Obtain a virus signature type identifier corresponding to the target file according to the check results.

As described above, if the obtained signature function identifiers are:

checkByKeyWord#keyword:trojan #offside:100;
checkByKeyWord#keyword:trojan #offside:200;
checkByKeyWord#keyword:trojan #offside:300;
checkByKeyWord#keyword:trojan #offside:400;
. . .

the following corresponding signature functions may be invoked:

checkByKeyWord ("trojan", 100, target);
checkByKeyWord ("trojan", 200, target);
checkByKeyWord ("trojan", 300, target);
checkByKeyWord ("trojan", 400, target);
. . . .

Each signature function may return a Boolean variable of true or false as a check result (where, in another embodiment, the check result may also be a return value of a numerical value type, a character string type, or a customized type), to indicate that the check succeeds or the check fails.

In this embodiment, the step of obtaining a virus signature type identifier corresponding to the target file according to the check results includes: traversing the virus signature type identifiers in the virus signature database, and obtaining signature function identifiers corresponding to each virus signature type identifier; and obtaining check results of signature functions corresponding to the signature function identifiers, and if all the check results indicate that the target file passes the check, determining that the traversed virus signature type identifier corresponds to the target file.

In an application scenario, as described above, the mapping information between the signature function identifiers and the virus signature type identifiers in virus signature information is shown in Table 1:

TABLE 1

| Signature function identifier | Virus signature type identifier |
| --- | --- |
| checkByKeyWord ("trojan", 100, target) | 00001; 00002 |
| checkByKeyWord ("trojan", 200, target) | 00001; 00003 |
| checkByKeyWord ("trojan", 300, target) | 00002 |
| checkByKeyWord ("trojan", 400, target) | 00003 |
| checkByKeyWord ("trojan", 500, target) | 00002; 00003 |
| checkByKeyWord ("trojan", 600, target) | 00001; 00002; 00003 |

If return values of checkByKeyWord ("trojan", 100, target), checkByKeyWord ("trojan", 200, target), and checkByKeyWord ("trojan", 600, target) are all "true", the target file corresponds to the virus signature type identifier 00001, that is, the target file is infected with the panda joss-stick.

If return values of checkByKeyWord ("trojan", 100, target), checkByKeyWord ("trojan", 200, target), checkByKeyWord ("trojan", 500, target), and checkByKeyWord ("trojan", 600, target) are all "true", the target file corresponds to the virus signature type identifier 00002, that is, the target file is infected with the Graybird.

If return values of checkByKeyWord ("trojan", 200, target), checkByKeyWord ("trojan", 400, target), check-ByKeyWord ("trojan", 500, target), and checkByKeyWord ("trojan", 600, target) are all "true", the target file corresponds to the virus signature type identifier 00003, that is, the target file is infected with the worm.

It should be noted that, Table 1 is only used to show the mapping information between the signature function identifiers and the virus signature type identifiers in a given application scenario, and in actual running, it is unnecessary to set a data table that is completely the same as Table 1 to store the mapping information. In addition, the target file may correspond to multiple virus signature type identifiers, that is, the target file may be infected with multiple computer viruses at the same time.

In this embodiment, further, after the step of checking the target file by invoking the signature functions, to obtain corresponding check results, the method further includes: determining whether the check result indicates that the target file passes the check, and if the check result does not indicate that the target file passes the check, obtaining a signature function identifier corresponding to the check result, obtaining a virus signature type identifier corresponding to the signature function identifier, and marking the virus signature type identifier as skippable.

Further, the step of traversing the virus signature type identifiers in the virus signature database includes: skipping the virus signature type identifier marked as skippable.

Further, after the step of extracting signature function identifiers from the virus signature database, the method further includes: obtaining virus signature type identifiers corresponding to the extracted signature function identifiers, and filtering out a signature function identifier, virus signature type identifiers corresponding to which are all marked as skippable.

For example, in an application scenario, a scan log table may be set, as shown in Table 2:

TABLE 2

| Virus signature type identifier | State | Identifier of signature function with the return value "false" | Quantity of signature functions with the return value "true" |
| --- | --- | --- | --- |
| 00001 | Being checked | NULL | 1 |
| 00002 | Being checked | NULL | 1 |
| 00003 | Being checked | NULL | 0 |

Table 2 shows a scan log after the signature function checkByKeyWord ("trojan", 100, target) is executed.

If the return value after the signature function check-ByKeyWord ("trojan", 100, target) is executed is "true", that is, the target file passes the check, the virus signature type identifiers 00001 and 00002 corresponding to the signature function are both in a state of being checked, that is, the target file has a risk of being infected with the panda joss-stick and the Graybird, and needs to be further checked.

Further, as shown in Table 3:

TABLE 3

| Virus signature type identifier | State | Identifier of signature function with the return value "false" | Quantity of signature functions with the return value "true" |
| --- | --- | --- | --- |
| 00001 | Skippable | checkByKeyWord ("trojan", 200, target) | 1 |

TABLE 3-continued

| Virus signature type identifier | State | Identifier of signature function with the return value "false" | Quantity of signature functions with the return value "true" |
|---|---|---|---|
| 00002 | Being checked | NULL | 1 |
| 00003 | Skippable | checkByKeyWord ("trojan", 200, target) | 0 |

Table 3 shows a scan log after the signature function checkByKeyWord ("trojan", 200, target) is executed.

If the return value of the signature function checkByKeyWord ("trojan", 200, target) is "false", that is, the target file does not pass the check, the virus signature type identifiers 00001 and 00003 corresponding to the signature function are both marked as skippable (as shown in Table 3, the states of 00001 and 00003 have been modified), that is, the target file is not infected with the panda joss-stick and the worm.

However, because the signature function checkByKeyWord ("trojan", 400, target) corresponds to the virus signature type identifier 00003 that has been marked as skippable, the signature function may be ignored, and further, subsequent checkByKeyWord ("trojan", 500, target) may be executed. Although the virus signature type identifiers corresponding to the signature function include 00003, the signature function further corresponds to the virus signature type identifier 00002, and because 00002 is still in a state of being checked, the signature function cannot be skipped, and needs to be executed.

In this embodiment, the mapping information between the signature function identifiers and the virus signature type identifiers may further include a rated function quantity of signature function identifiers corresponding to each virus signature type identifier. For example, in the foregoing example, 00001 corresponds to 3 signature function identifiers, 00002 corresponds to 4 signature function identifiers, and 00003 corresponds to 4 signature function identifiers.

Further, it may be determined, according to the rated function quantity, whether all the check results indicate that the target file passes the check. As shown in Table 2 and Table 3, after checkByKeyWord ("trojan", 100, target) (which corresponds to 00001 and 00002) is executed and the target file passes the check, the quantities of signature functions with the return value "true" corresponding to 00001 and 00002 are both increased by 1; after checkByKeyWord ("trojan", 200, target) (which corresponds to 00001 and 00003) is executed and the target file does not pass the check, the quantities of signature functions with the return value "true" are not updated; after checkByKeyWord ("trojan", 300, target) (which only corresponds to 00002) is executed and the target file passes the check, the quantity of signature functions with the return value "true" corresponding to 00002 may be increased by 1 (that is, the quantity of signature functions with the return value "true" is updated to 2); and then it may be determined whether the quantity of signature functions with the return value "true" is equal to the rated function quantity included in the mapping information related to 00002, if the quantity of signature functions with the return value "true" is equal to the rated function quantity included in the mapping information related to 00002, the check results returned by all the signature functions corresponding to 00002 are all "true", and the target file corresponds to the virus signature type identifier 00002, that is, the target file is infected with the Graybird, or otherwise, a subsequent signature function is executed.

In this example, the rated function quantity corresponding to 00002 is 4, and therefore, the subsequent signature functions such as checkByKeyWord ("trojan", 500, target) and checkByKeyWord ("trojan", 600, target) need to be executed; if check results returned by checkByKeyWord ("trojan", 500, target) and checkByKeyWord ("trojan", 600, target) are both "true", the quantity of signature functions with the return value "true" is increased by 2, that is, updated to 4, which is equal to the rated function quantity corresponding to 00002. In this case, it is determined that the target file corresponds to the virus signature type identifier 00002, that is, the target file has been infected with the Graybird.

In this embodiment, after the step of marking the virus signature type identifier as skippable, the method further includes: determining whether all the virus signature type identifiers in the virus signature database are marked as skippable, and if all the virus signature type identifiers in the virus signature database are marked as skippable, determining that the target file is secure.

For example, if the check result returned by checkByKeyWord ("trojan", 500, target) is "false", the scan log is shown in Table 4:

TABLE 4

| Virus signature type identifier | State | Identifier of signature function with the return value "false" | Quantity of signature functions with the return value "true" |
|---|---|---|---|
| 00001 | Skippable | checkByKeyWord ("trojan", 200, target) | 1 |
| 00002 | Skippable | checkByKeyWord ("trojan", 500, target) | 2 |
| 00003 | Skippable | checkByKeyWord ("trojan", 200, target) | 0 |

Because all the virus signature type identifiers, namely, 00001, 00002, and 00003, are marked as skippable, it may be determined that the target file is not infected with the panda joss-stick, the Graybird, or the worm, and is a secure file. At this time, execution of the subsequent signature function checkByKeyWord ("trojan", 600, target) may be stopped, thereby avoiding an unnecessary function invocation, reducing a virus scanning and removing time, and improving virus scanning and removing efficiency.

It should be noted that, Table 2, Table 3, and Table 4 are only used to describe a process of marking a virus signature type identifier as skippable, and in an actual application, the process is not limited to the form of Table 2, Table 3, and Table 4. Preferably, recording a virus signature type identifier marking process in the form of the foregoing log tables may facilitate generation of matching logs, thereby helping a user learn, through logs, a process of checking by invoking signature functions.

In addition, it should be noted that, in another embodiment, the return value "false" may also be used to indicate that the target file passes the check, that is, the virus signature corresponding to the signature function matches the target file. Herein, for ease of description, an example in which the return value "true" indicates that the target file passes the check is used for description. In an actual application, a return value indicating that the target file passes the check may be set according to an actual requirement.

Preferably, after the step of generating the virus signature database according to the generated mapping information, the method further includes: obtaining signature function attribute values corresponding to the signature function identifiers, where each signature function attribute value includes at least one of a signature function name, whether an I/O function or not, an offset parameter, and time elapsed for execution; and sorting the signature function identifiers according to the signature function attribute values.

The signature function name is a name defined for a signature function, whether an I/O function or not indicates whether the signature function needs an I/O operation (that is, an operation such as hard disk read/write or network transmission) in a check process, the offset parameter is information about a location of read data in a data stream of the target file when the target file is checked, and the time elapsed for execution is a pre-measured time needed for executing the signature function. The time elapsed for execution may be a level of time elapsed, for example, the time elapsed for execution includes three levels, namely, a low level, a medium level, and a high level; by means of a test, a signature function may be classified, according to time it takes to execute the signature function and a threshold, to a corresponding level.

In the foregoing example, byte values at locations having offsets of 100 and 200 in the target file need to be read separately by using a signature function checkByByte, and compared with 34 and 44 separately; and String values at locations having offsets of 100 and 200 in the target file need to be read separately by using a signature function checkByKeyWord, and compared with "trojan" and "panda" separately. Signature function identifiers corresponding to function names may be sorted according to an alphabetical order of the function names and corresponding offsets, as shown in Table 5.

TABLE 5

| Sequential number | Signature function identifier |
|---|---|
| 1 | checkByByte#byte: 34#offside: 100 |
| 2 | checkByByte#byte: 44#offside: 200 |
| 3 | checkByKeyWord#keyword: trojan #offside: 100 |
| 4 | checkByKeyWord#keyword: panda#offside: 200 | checkByByte#byte:34#offside:100 and checkByByte#byte:44#offside:200 may both correspond to the following signature function:

checkByByte (byte[ ] num, int[ ] offside, File target).

In this case, when function parameters passed to the signature function before the signature function is invoked, among the function parameters, an array element num [0] is "34", and num [1] is "44"; and among the function parameters, an array element offside [0] is 100, and offside [1] is 200. Because offsets in offside[ ] are sorted in ascending order, during a sequential search, a search pointer may first sequentially moves from a location having an offside of 0 to a location having an offside of 100, and then moves from the location having an offside of 100 to a location having an offside of 200. On the contrary, if offsets are not sorted, where offside [0] is 200 and offside [1] is 100, the search pointer needs to first sequentially move from the location having an offside of 0 to the location having an offside of 200, then moves back to the location having an offside of 0, and further moves from the location having an offside of 0 to the location having an offside of 100. The pointer moves a lot of times. In other words, sorting signature function identifiers according to the signature function attribute values can reduce the amount of calculation for a computer.

By arranging a signature function identifier that includes an I/O operation at a posterior position in the sequence, when a check of another signature function that does not include an I/O operation and corresponds to a virus signature type identifier corresponding to the signature function identifier that includes an I/O operation fails, the signature function identifier that includes an I/O operation may be skipped. In this manner, the corresponding signature function that needs an I/O operation is not executed, thereby saving time spent on preferentially executing the signature function that needs an I/O operation (generally, it takes a long time to perform an I/O operation). Similarly, by arranging a signature function identifier corresponding to shorter time elapsed for execution at an anterior position in the sequence, and arranging a signature function identifier corresponding to longer time elapsed for execution at a posterior position in the sequence, time spent on preferentially executing the signature function corresponding to longer time elapsed for execution can also be saved (generally, it takes a long time to perform an I/O operation).

In addition, if sorting is performed according to the signature function names and the offset parameters, the user may conveniently view a check process by using logs. As shown in the foregoing Table 4, the signature function with the return value "false" corresponding to 00002 is checkByKeyWord ("trojan", 500, target), which indicates that the target file passes the check of checkByKeyWord ("trojan", 100, target) and the check of checkByKeyWord ("trojan", 300, target) corresponding to 0002 (100 and 300 are both less than 500, the check results are returned before checkByKeyWord ("trojan", 500, target) is executed, and because no return value "false" corresponding to the two signature functions is recorded, the target file definitely passes the check of the two signature functions).

In an embodiment, after the step of generating the virus signature database according to the generated mapping information, the method further includes: obtaining function type information corresponding to the signature function identifiers, and classifying the signature function identifiers according to the obtained function type information.

Further, after the step of classifying the signature function identifiers according to the obtained function type information, the method further includes: sorting the signature function identifiers according to the function type information.

Further, the step of successively extracting signature function identifiers from the virus signature database may be specifically: successively extracting, from the virus signature database, signature function identifiers corresponding to same function type information.

In the foregoing example, signature function identifiers that include an I/O operation may be classified into a same class, and arranged at posterior positions during sorting, so as to be last executed, which can prevent unnecessary time spent on preferentially performing the I/O operation.

In the foregoing example, checkByByte#byte:34#offside: 100 and checkByByte#byte:44#offside:200 both correspond to the following signature function:

checkByByte (byte[ ] num, int[ ] offside, File target).

In this case, the two signature function identifiers may be classified into a same class, and when the signature function identifiers in the virus signature database are traversed and extracted, the two signature function identifiers may be extracted at the same time, and the check may be completed by invoking the signature function only once; a return value of the signature function may be a Boolean array, and each element in the array corresponds to a check result of the corresponding signature function identifier.

Figure 2:
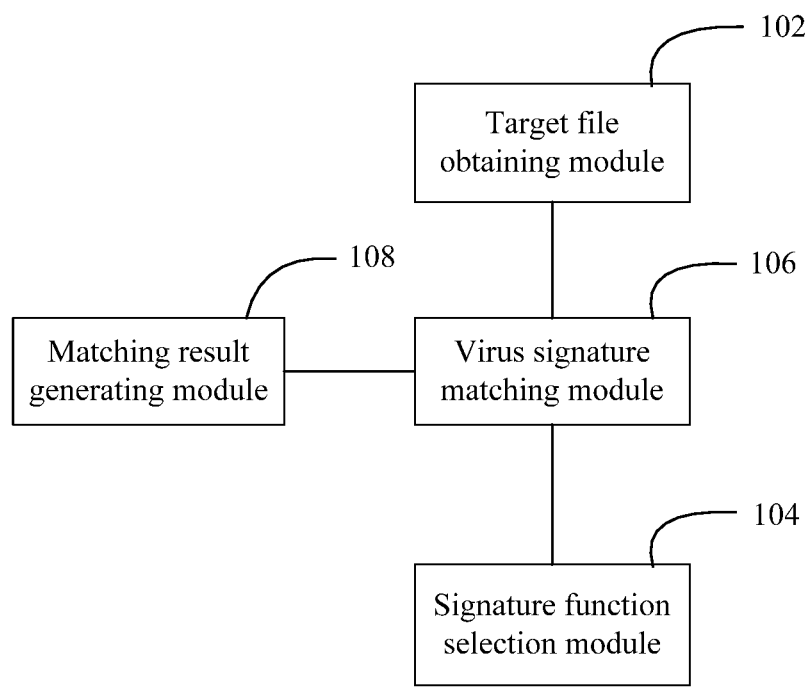
FIG. 2 is a schematic structural diagram of a virus signature matching apparatus in an embodiment.

In an embodiment, as shown in FIG. 2, a virus signature matching apparatus is provided, including a target file obtaining module 102, a signature function selection module 104, a virus signature matching module 106, and a matching result generating module 108. The target file obtaining module 102 is configured to obtain an inputted target file; the signature function selection module 104 is configured to load a virus signature database, and successively extract signature function identifiers from the virus signature database, the virus signature database including the signature function identifiers and virus signature type identifiers corresponding to the signature function identifiers; the virus signature matching module 106 is configured to obtain signature functions corresponding to the signature function identifiers, and check the target file by invoking the signature functions, to obtain corresponding check results; and the matching result generating module 108 is configured to obtain a virus signature type identifier corresponding to the target file according to the check results.

Figure 3:
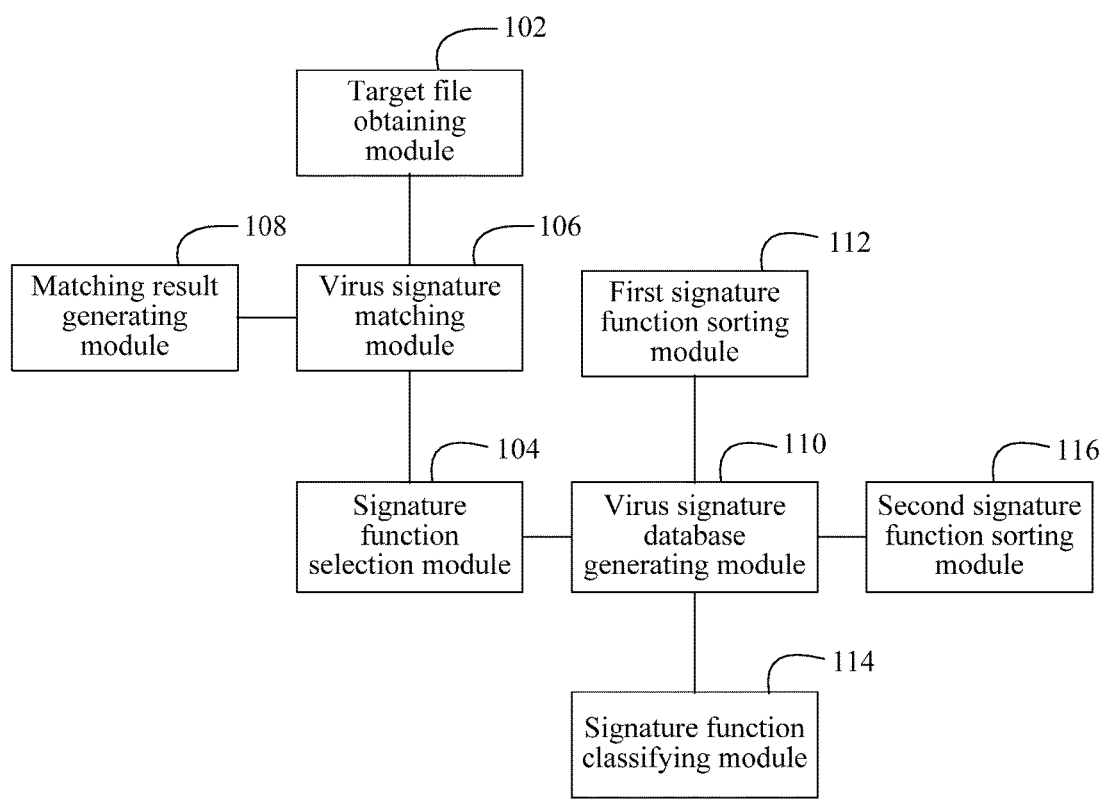
FIG. 3 is a schematic structural diagram of a virus signature matching apparatus in another embodiment.

In this embodiment, as shown in FIG. 3, the virus signature matching apparatus further includes a virus signature database generating module 110, configured to obtain inputted signature function identifiers, and obtain inputted virus signature type identifiers corresponding to the signature function identifiers; and generate mapping information between the signature function identifiers and the virus signature type identifiers, and generate the virus signature database according to the mapping information, where the mapping information includes at least one of a one-to-one correspondence, a many-to-one correspondence, a one-to-many correspondence, and a many-to-many correspondence.

In this embodiment, as shown in FIG. 3, the virus signature matching apparatus further includes a first signature function sorting module 112, configured to obtain signature function attribute values corresponding to the signature function identifiers, where each signature function attribute value includes at least one of a signature function name, whether an I/O function or not, an offset parameter, and time elapsed for execution; and sort the signature function identifiers according to the signature function attribute values.

In this embodiment, as shown in FIG. 3, the virus signature matching apparatus further includes a signature function classifying module 114, configured to obtain function type information corresponding to the signature function identifiers, and classify the signature function identifiers according to the obtained function type information.

In this embodiment, as shown in FIG. 3, the virus signature matching apparatus further includes a second signature function sorting module 116, configured to sort the signature function identifiers according to the function type information.

In this embodiment, the signature function selection module 104 is further configured to successively extract, from the virus signature database, signature function identifiers corresponding to same function type information.

In this embodiment, the matching result generating module 108 is configured to traverse the virus signature type identifiers in the virus signature database, and obtain signature function identifiers corresponding to each virus signature type identifier; and obtain check results of signature functions corresponding to the signature function identifiers, and if all the check results indicate that the target file passes the check, determine that the traversed virus signature type identifier corresponds to the target file.

In this embodiment, the virus signature matching module 106 is further configured to determine whether the check result indicates that the target file passes the check, and if the check result does not indicate that the target file passes the check, obtain a signature function identifier corresponding to the check result, obtain a virus signature type identifier corresponding to the signature function identifier, and mark the virus signature type identifier as skippable.

In this embodiment, the matching result generating module 108 is further configured to skip the virus signature type identifier marked as skippable.

In this embodiment, the signature function selection module 104 is further configured to obtain virus signature type identifiers corresponding to the extracted signature function identifiers, and filter out a signature function identifier, virus signature type identifiers corresponding to which are all marked as skippable.

In this embodiment, the matching result generating module 108 is further configured to determine whether all the virus signature type identifiers in the virus signature database are all marked as skippable, and if all the virus signature type identifiers in the virus signature database are marked as skippable, determine that the target file is secure.

When the foregoing virus signature matching method and apparatus perform virus scanning and removing on a target file, a same signature function is executed only once, but is not executed multiple times according to different virus signature types that need to be matched, thereby reducing the number of times the signature function is executed repeatedly, and improving virus scanning and removing efficiency.

Figure 4:
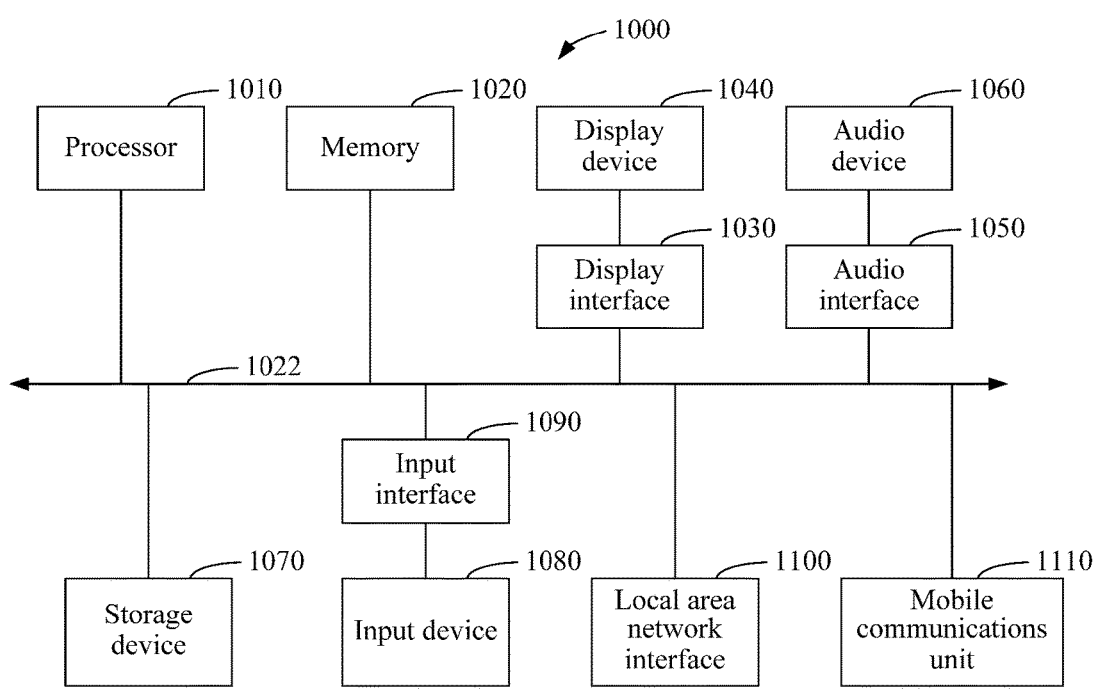
FIG. 4 is a diagram of a computer hardware environment for executing a virus signature matching method in an embodiment.

In an embodiment, as shown in FIG. 4, FIG. 4 is a block diagram of a computer system 1000 that can implement the embodiments of the present invention. The computer system 1000 is merely an example of computer environments applicable to the present disclosure, and should not be construed as any limitation on the application scope of the present disclosure. The computer system 1000 also should not be interpreted as needing to rely on or have one or a combination of parts of the exemplary computer system 1000 shown in the figure.

The computer system 1000 shown in FIG. 4 is an example of computer systems suitable for use in the present disclosure. Other architectures having different subsystem configurations may also be used. For example, well-known devices such as a desktop computer, a notebook computer, a personal digital assistant, a smart phone, a tablet computer, a portable media player and a set-top box are applicable to some embodiments of the present invention, but the present disclosure is not limited thereto.

As shown in FIG. 4, the computer system 1000 includes a processor 1010, a memory 1020 and a system bus 1022. Various system components including the memory 1020 and the processor 1010 are connected to the system bus 1022. The processor 1010 is hardware for executing computer program instructions by means of basic arithmetic and logic operations in the computer system. The memory 1020 is a physical device for temporarily or permanently storing computer programs or data (for example, program state information). The system bus 1022 may be any one of the following types of bus structures: a memory bus or memory controller, a peripheral bus and a local bus. The processor 1010 and the memory 1020 can perform data communication through the system bus 1022. The memory 1020 includes a read-only memory (ROM) or a flash memory (both not shown), and a random access memory (RAM), where the RAM generally refers to main memory loaded with an operating system and application programs.

The computer system 1000 further includes a display interface 1030 (for example, a graphics processing unit), a display device 1040 (for example, a liquid crystal display), an audio interface 1050 (for example, a sound card) and an audio device 1060 (for example, a loudspeaker). The display device 1040 and the audio device 1060 are media devices for presenting multimedia content.

The computer system 1000 generally includes one storage device 1070. The storage device 1070 may be selected from multiple types of computer readable media. The computer readable media refer to any available media that can be accessed by the computer system 1000, and include removable media and non-removable media. For example, the computer readable media include, but not limited to, a flash memory (micro SD card), a CD-ROM, a digital versatile disc (DVD) or other optical storage, a cassette, a magnetic tape, a disk storage or other magnetic storage devices, or any other media that can be used to store required information and can be accessed by the computer system 1000.

The computer system 1000 further includes an input device 1080 and an input interface 1090 (for example, an IO controller). A user may input an instruction and information into the computer system 1000 by using the input device 1080, such as a keyboard and a mouse. The input device 1080 is generally connected to the system bus 1022 through the input interface 1090, but may also be connected through other interfaces or bus structures, such as a universal serial bus (USB).

The computer system 1000 may be logically connected to one or more network devices in a network environment. The network device may be a personal computer, a server, a router, a smart phone, a tablet computer or other public network nodes. The computer system 1000 is connected to the network device through a local area network (LAN) interface 1100 or a mobile communications unit 1110. The LAN refers to an interconnected computer network in a limited area such as a family, a school, a computer laboratory, or an office building using network media. WiFi and Ethernet over twisted pair are the most commonly used two technologies for building a local area network. WiFi is a technology that enables the computer systems 1000 to exchange data or to be connected to a wireless network through radio waves. The mobile communications unit 1110 is capable of making and receiving calls through radio communications lines while moving in a broad geographic area. In addition to calling, the mobile communications unit 1110 also supports Internet access in a 2G, 3G or 4G cellular communications system that provides mobile data services.

It should be noted that other computer systems including more or fewer subsystems than those of the computer system 1000 are also applicable to the present disclosure.

As described above in detail, the computer system 1000 applicable to the present disclosure can execute specified operations in a virus signature matching method. The computer system 1000 executes these operations in the form of running software instructions in the computer readable media by the processor 1010. These software instructions may be read into the memory 1020 from the storage device 1070 or from another device through the local area network interface 1100. The software instructions stored in the memory 1020 enable the processor 1010 to execute the virus signature matching method. Moreover, the present disclosure may also be implemented by using a hardware circuit or by using a combination of a hardware circuit and software instructions. Therefore, the implementation of the present disclosure is not limited to any particular combination of a hardware circuit and software.

The foregoing embodiments only describe several implementation manners of the present disclosure, and their description is specific and detailed, but cannot therefore be understood as a limitation to the patent scope of the present disclosure. It should be noted that, a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A virus signature matching method, comprising:
   establishing a virus signature database, comprising:
      obtaining signature function identifiers, and obtaining virus signature type identifiers corresponding to the signature function identifiers, wherein
         each of the signature function identifiers is an identification information of a signature function used to check whether an inputted target file matches a given virus signature in the virus signature database, and includes information of a signature function name, a parameter name or a parameter value, and
         each of the virus signature type identifiers corresponds to a type of computer virus, and one identifier number is set to one corresponding virus;
      generating a mapping information between the signature function identifiers and the virus signature type identifiers; and
      generating the virus signature database according to the mapping information;
   obtaining the inputted target file;
   loading the virus signature database, and successively extracting the signature function identifiers from the virus signature database;
   obtaining signature functions corresponding to the signature function identifiers, and checking the inputted target file by invoking the signature functions, to obtain corresponding check results of the inputted target file; and
   after obtaining the signature functions, obtaining a virus signature type identifier corresponding to the inputted target file according to the check results.

2. The virus signature matching method according to claim 1, wherein
   the mapping information comprises at least one of a one-to-one correspondence, a many-to-one correspondence, a one-to-many correspondence, and a many-to-many correspondence.

3. The virus signature matching method according to claim 2, wherein, after the step of generating the virus signature database according to the generated mapping information, the method further comprises:
   obtaining signature function attribute values corresponding to the signature function identifiers, wherein each signature function attribute value comprises at least one of the signature function name, whether an I/O function or not, an offset parameter, and time elapsed for execution; and
   sorting the signature function identifiers according to the signature function attribute values.

4. The virus signature matching method according to claim 2, wherein, after the step of generating the virus signature database according to the generated mapping information, the method further comprises:
obtaining function type information corresponding to the signature function identifiers, and classifying the signature function identifiers according to the obtained function type information.

5. The virus signature matching method according to claim 2, wherein, after the step of classifying the signature function identifiers according to the obtained function type information, the method further comprises:
sorting the signature function identifiers according to the function type information.

6. The virus signature matching method according to claim 4, wherein the step of successively extracting signature function identifiers from the virus signature database includes:
successively extracting, from the virus signature database, signature function identifiers that correspond to same function type information.

7. The virus signature matching method according to claim 1, wherein the step of obtaining a virus signature type identifier corresponding to the target file according to the check results comprises:
traversing the virus signature type identifiers in the virus signature database, and obtaining signature function identifiers corresponding to each virus signature type identifier; and
obtaining check results of signature functions corresponding to the signature function identifiers, and if all the check results indicate that the target file passes the check, determining that the traversed virus signature type identifier corresponds to the target file.

8. The virus signature matching method according to claim 7, wherein, after the step of checking the target file by invoking the signature functions, to obtain corresponding check results, the method further comprises:
determining whether the check result indicates that the target file passes the check, and if the check result does not indicate that the target file passes the check, obtaining a signature function identifier corresponding to the check result, obtaining a virus signature type identifier corresponding to the signature function identifier, and marking the virus signature type identifier as skippable.

9. The virus signature matching method according to claim 8, wherein the step of traversing the virus signature type identifiers in the virus signature database comprises:
skipping the virus signature type identifier marked as skippable.

10. The virus signature matching method according to claim 8, wherein, after the step of extracting signature function identifiers from the virus signature database, the method further comprises:
obtaining virus signature type identifiers corresponding to the extracted signature function identifiers, and filtering out a signature function identifier, virus signature type identifiers corresponding to which are all marked as skippable.

11. The virus signature matching method according to claim 8, wherein, after the step of marking the virus signature type identifier as skippable, the method further comprises:
determining whether all the virus signature type identifiers in the virus signature database are marked as skippable, and if all the virus signature type identifiers in the virus signature database are marked as skippable, determining that the target file is secure.

12. A virus signature matching apparatus, comprising:
a memory;
a processor coupled to the memory, wherein the processor is configured to:
establish a virus signature database, comprising:
obtain signature function identifiers, and obtain virus signature type identifiers corresponding to the signature function identifiers, wherein
each of the signature function identifiers is an identification information of a signature function used to check whether an inputted target file matches a given virus signature in the virus signature database, and includes information of a signature function name, a parameter name or a parameter value, and
each of the virus signature type identifiers corresponds to a type of computer virus, and one identifier number is set to one corresponding virus;
generate a mapping information between the signature function identifiers and the virus signature type identifiers; and
generate the virus signature database according to the mapping information; obtain the inputted target file;
load the virus signature database, and successively extract the signature function identifiers from the virus signature database;
obtain signature functions corresponding to the signature function identifiers, and check the inputted target file by invoking the signature functions, to obtain corresponding check results of the inputted target file; and
after obtaining the signature functions, obtain a virus signature type identifier corresponding to the inputted target file according to the check results.

13. The virus signature matching apparatus according to claim 12, wherein
the mapping information comprises at least one of a one-to-one correspondence, a many-to-one correspondence, a one-to-many correspondence, and a many-to-many correspondence.

14. The virus signature matching apparatus according to claim 13, wherein the processor is further configured to obtain signature function attribute values corresponding to the signature function identifiers, wherein each signature function attribute value comprises at least one of the signature function name, whether an I/O function or not, an offset parameter, and time elapsed for execution; and sort the signature function identifiers according to the signature function attribute values.

15. The virus signature matching apparatus according to claim 13, wherein the processor is further configured to obtain function type information corresponding to the signature function identifiers, and classify the signature function identifiers according to the obtained function type information.

16. The virus signature matching apparatus according to claim 13, wherein the processor is further configured to sort the signature function identifiers according to the function type information.

17. The virus signature matching apparatus according to claim 15, wherein the processor is further configured to successively extract, from the virus signature database, signature function identifiers that correspond to same function type information.

18. The virus signature matching apparatus according to claim 12, wherein the processor is further configured to traverse the virus signature type identifiers in the virus signature database, and obtain signature function identifiers corresponding to each virus signature type identifier; and obtain check results of signature functions corresponding to the signature function identifiers, and if all the check results indicate that the target file passes the check, determine that the traversed virus signature type identifier corresponds to the target file.

19. The virus signature matching apparatus according to claim 18, wherein the processor is further configured to determine whether the check result indicates that the target file passes the check, and if the check result does not indicate that the target file passes the check, obtain a signature function identifier corresponding to the check result, obtain a virus signature type identifier corresponding to the signature function identifier, and mark the virus signature type identifier as skippable.

20. The virus signature matching apparatus according to claim 19, wherein the processor is further configured to skip the virus signature type identifier marked as skippable.

21. The virus signature matching apparatus according to claim 19, wherein the processor is further configured to obtain virus signature type identifiers corresponding to the extracted signature function identifiers, and filter out a signature function identifier, virus signature type identifiers corresponding to which are all marked as skippable.

22. The virus signature matching apparatus according to claim 19, wherein the processor is further configured to determine whether all the virus signature type identifiers in the virus signature database are marked as skippable, and if all the virus signature type identifiers in the virus signature database are marked as skippable, determine that the target file is secure.

* * * * *